United States Patent
Duron et al.

(10) Patent No.: US 7,571,307 B2
(45) Date of Patent: Aug. 4, 2009

(54) CAPACITY UPGRADE ON-DEMAND FOR I/O ADAPTERS

(75) Inventors: Mike C. Duron, Pflugerville, TX (US); Mark D. McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 11/459,946

(22) Filed: Jul. 26, 2006

(65) Prior Publication Data

US 2008/0028198 A1    Jan. 31, 2008

(51) Int. Cl.
G06F 9/00      (2006.01)
G06F 15/177    (2006.01)
G06F 1/24      (2006.01)
G06F 3/00      (2006.01)

(52) U.S. Cl. .............. 713/1; 713/2; 713/100; 710/10; 710/18

(58) Field of Classification Search .......... 713/1, 713/100; 710/10, 18
See application file for complete search history.

(56) References Cited

U.S. PATENT DOCUMENTS

| 5,903,650 | A   |   | 5/1999 | Ross et al. |
| 6,169,976 | B1  |   | 1/2001 | Colosso |
| 7,353,375 | B2  | * | 4/2008 | Cepulis ................. 713/1 |
| 7,373,497 | B2  | * | 5/2008 | Circenis et al. ......... 713/100 |
| 2002/0120726 | A1 |   | 8/2002 | Padole et al. |
| 2002/0188704 | A1 |   | 12/2002 | Gold et al. |
| 2005/0131711 | A1 |   | 6/2005 | Bouriant et al. |

OTHER PUBLICATIONS

"Logical Partition Security in the IBM eserver pSeries 690", IBM Corporation www-03.ibm.com/servers/eserver/pseries/hardware/whitepapers/lpar_security.html, 5 pages, Mar. 10, 2007.
Gibbs et al., "Advanced Power Virtualization on IBM eserver p5 Servers: Architecture and Performance Considerations", Redbooks, IBM Corporation, Nov. 2005, www.redbooks.ibm.com/redbooks/pdfs/sg245768.pdf, 436 pages (first page submitted).

(Continued)

Primary Examiner—Thomas Lee
Assistant Examiner—Stefan Stoynov
(74) Attorney, Agent, or Firm—Stephen J. Walder, Jr.; Libby Z. Handelsman (57) ABSTRACT

Mechanisms are provided for performing capacity upgrade on-demand operations for input/output(I/O) adapters of a data processing device. The mechanisms involve providing a data processing device with additional I/O adapters in excess of current I/O capacity requirements of an owner/user of the data processing device. These additional I/O adapters remain in an inactive state after booting of the data processing device until they are specifically activated by the owner/user. Although inactive, memory resources are reserved for the address translation data structures for these inactive I/O adapters. The owner/user may, at a later time, obtain an activation code from a provider of the data processing device and enter the activation code into a hardware management console to thereby activate the additional I/O adapters. The reserved memory resources are then utilized to initialize the address translation data structures for these now active I/O adapters.

20 Claims, 4 Drawing Sheets

OTHER PUBLICATIONS

Domberg et al., "IBM eserver p5 590 and 595 System Handbook", Redbooks, IBM Corporation, Mar. 2005, www.redbooks.ibm.com/redbooks/pdfs/sg249119.pdf, 316 pages (first page submitted).

"TCE table memory sizes on pSeries LPARS, TIPS0357", Redbooks Technote, IBM Corporation, www.redbooks.ibm.com/Redbooks.nsf/RedbookAbstracts/tips0357.html, 2 pages, Jan. 22, 2004.

* cited by examiner

CAPACITY UPGRADE ON-DEMAND FOR I/O ADAPTERS

BACKGROUND

1. Technical Field

The present application relates generally to an improved data processing system and method. More specifically, the present application is directed to a system and method for providing capacity upgrade on-demand of I/O adapters.

2. Description of Related Art

For purchasers of computing systems, the upgradeability of the computing systems is of great importance. That is, purchasers want to know that as their needs for computing system resources change, their purchased computing systems are able to be upgraded to meet their changing needs. Typically, such upgradeability has been provided by way of expansion ports and removable devices that may be attached to the computing system via such ports.

With high end computing systems, such as server computing systems and the like, upgrading typically requires that the owner of the server computing system order additional devices from a producer of such devices and have a customer engineer from that producer install the device in the server computing system. For example, if a customer wishes to expand their input/output (I/O) resources, the customer must order a new I/O adapter from the manufacturer of the I/O adapter, wait for delivery of the part, and then schedule a customer engineer from the manufacturer to come to the location of the server computing system to install the new I/O adapter into the server computing system. If the owner of the server computing system wants the new I/O adapter to be installed while the server computing system is running, the owner must reserve an expansion slot of the server computing system manually before initial program load and then follow a concurrent maintenance procedure to add the I/O adapter, i.e. the field replaceable unit (FRU).

It can be seen from the above that the current method of adding resources to a computing system is costly and time consuming. If the manufacturer does not charge explicitly for the customer engineer's time to install the new device into the server computing system, the cost will typically be passed on to the owner of the server computing system in other ways, e.g., in the cost of the server computing system itself, in the cost of the new device, or the like. Moreover, the owner of the server computing system must spend a large amount of time waiting for delivery of the new device and waiting for the customer engineer to come to the site of the server computing system to install the new device. Thus, while the owner of the server computing system may have an immediate need for additional resources, this need may not be able to be met immediately.

SUMMARY

In one illustrative embodiment, a method, in a data processing system, for enabling an inactive input/output (I/O) adapter of the data processing system is provided. The method may comprise booting the data processing system to an operational state in which the inactive I/O adapter is inactive and not initialized after the data processing system is booted. Memory resources for the inactive I/O adapter of the data processing system may be reserved while the inactive I/O adapter is inactive. The memory resources are reserved to store an address translation data structure for the inactive I/O adapter in the event that the inactive I/O adapter is activated. The method may further comprise receiving a request to activate the inactive I/O adapter and executing a miniboot code sequence for initializing the inactive I/O adapter using the reserved memory resources in response to receiving the request to activate the inactive I/O adapter. The request to activate the inactive I/O adapter may be received from a hardware management console computing device coupled to the data processing system.

In other illustrative embodiments, a computer program product comprising a computer usable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
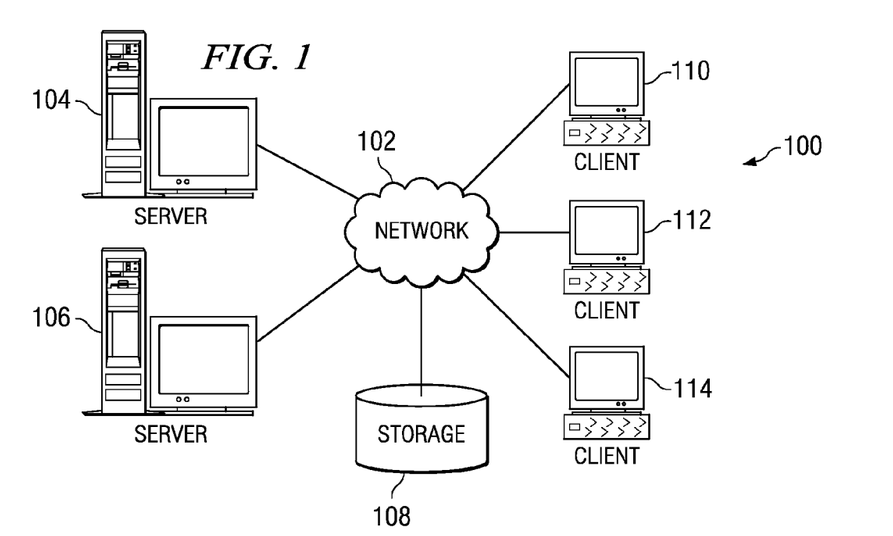
FIG. 1 depicts a pictorial representation of an exemplary distributed data processing system in which aspects of the illustrative embodiments may be implemented.
Figure 2:
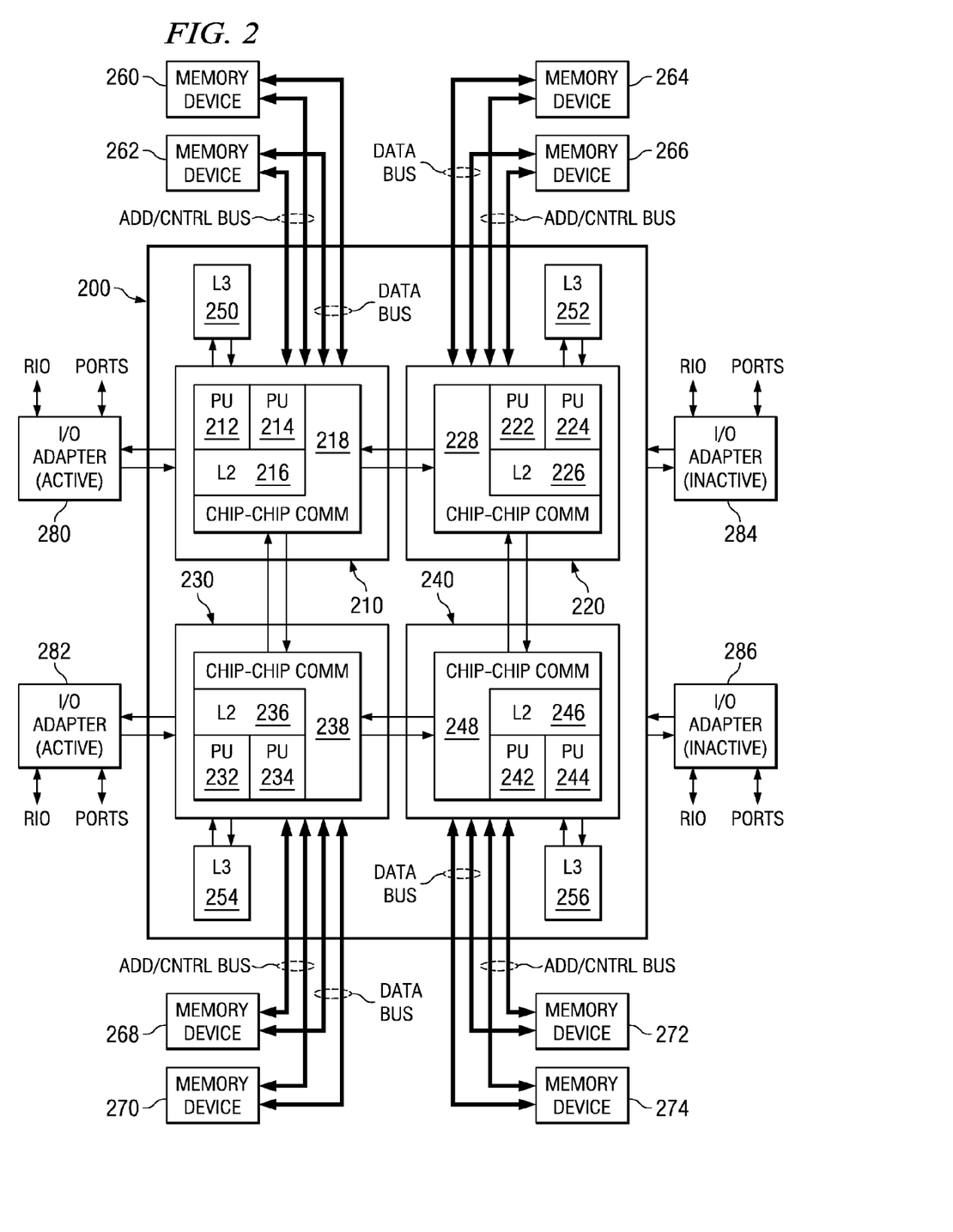
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With particular regard to the illustrative embodiments, server 104 may be, for example, a server computing device comprising one or more processors and a plurality of input/output (I/O) adapters, some of which are active and others of which are inactive. For example, an individual or organization may purchase the server 104 with additional inactive I/O adapters in expectation of future requirements for additional I/O adapters, e.g., as the organization or its customers demand additional I/O capacity. The illustrative embodiments herein provide a mechanism for activating such additional I/O adapters in the server 104 in the event that additional I/O capacity is required.

In one exemplary embodiment, the server 104 is an IBM eserver p5-590 or p5-595 server, available from International Business Machines, Inc. of Armonk, N.Y. The server 104 may have a hardware management console (HMC) associated with it, either provided on a separate computing device in communication with the server 104, or provided within the server 104, which is used to configure the server 104. As one of the configuration functions provided by the HMC, a capacity upgrade on-demand functionality is provided. This capacity upgrade on-demand functionality provides the HMC with the ability to dynamically activate inactive I/O adapters, processors, and portions of memory, for use by an owner of the server 104. Through the HMC, an owner of the server 104 may enter appropriate commands and codes for activating the inactive I/O adapters, processors, and portions of memory so as to meet the current needs of the organization and customers of the organization. Such codes may be purchased from a provider of the server 104 when needed. Thus, an owner of the server 104 need only purchase the amount of I/O capacity, processing capacity, and memory capacity, the owner needs as his/her/its needs change.

FIG. 2 is an exemplary diagram illustrating one possible server computing device in which exemplary aspects of the illustrative embodiments may be implemented. It should be noted that FIG. 2 is a simplified diagram of a server computing device for purposes of illustrating the additional inactive I/O adapters being provided in the server computing device. Additional components of the server computing device may be provided which are not depicted in FIG. 2. FIG. 2 should not be considered limiting with regard to the particular configuration and elements that may be included in a server computing device which utilizes the mechanisms of the illustrative embodiments.

The example shown in FIG. 2 is of an IBM eserver p5-590 server computing device, however it should be appreciated that the illustrative embodiments are not limited to such. Rather, the mechanisms of the illustrative embodiments may be utilized with any computing device in which inactive I/O adapters are provided for later activation using the mechanisms of the illustrative embodiments. In fact, the mechanisms of the illustrative embodiments are not limited to server computing devices and may be utilized with any computing device that may make use of the mechanisms of the illustrative embodiments to provided capacity upgrade on-demand of I/O adapters.

As shown in FIG. 2, the server computing device comprises one or more multichip modules 200 (only one of which is shown in detail in FIG. 2 for simplicity). Each multichip module 200 includes a plurality of processor chips 210-240. Each processor chip contains one or more processor units (PUs) or cores 212-214, 222-224, 232-234, and 242-244, a level 2 (L2) cache 216, 226, 236, 246, and chip-to-chip communication circuitry 218, 228, 238, and 248. Each processor chip 210-240 is in communication with a level 3 (L3) cache 250, 252, 254 and 256. The processor chips 210-240 are further in communication with memory devices 260-274.

A plurality of I/O adapters 280-286 are provided with which the processor chips 210-240 may communicate. In the depicted example, the I/O adapters 280-286 are GX+I/O hub adapters, such as may be used with the IBM eserver p5-590 or p5-595 server computing devices, although the present invention is not limited to such I/O adapters. Communication between the various elements in FIG. 2 may be facilitated by one or more buses of a bus system, bridges, and the like, as is generally known in the art. The bus system may be implemented using any type of communication fabric or architecture that provides for a transfer of data between different components or devices attached to the fabric or architecture.

With regard to the illustrative embodiments, some of the I/O adapters, e.g., I/O adapters 280-282, may be active and in communication with the processor chips 210-240 while others, e.g., I/O adapters 284-286, may be inactive and are not being communicated with by the processor chips 210-240. These I/O adapters 284-286 may be activated at a later time by use of the mechanisms of the illustrative embodiments described herein. Once activated, the I/O adapters 284-286 may be placed in communication with the processor chips 210-240 such that the processor chips 210-240 may communicate with these I/O adapters 284-286 in a similar manner as they communicate with I/O adapters 280-282.

An operating system runs on one or more of the processing units (PUs) of the processor chips 210-240. For example, the server processing device may run the Advanced Interactive Executive (AIX®) operating system and/or the LINUX® operating system (AIX is a trademark of International Business Machines Corporation in the United States, other countries, or both, while LINUX is a trademark of Linus Torvalds in the United States, other countries, or both). Instructions for the operating system, the object-oriented programming system, and applications or programs may be located on storage devices (not shown), such as a hard disk, and may be loaded into memory devices 260-274 for execution by the processing units 212-214, 222-224, 232-234, and 242-244.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Moreover, the data processing device depicted in FIG. 2 may take the form of any of a number of different data processing devices including client computing devices, server computing devices, a tablet computer, laptop computer, telephone or other communication device, a personal digital assistant (PDA), or the like. In some illustrative examples, the data processing device may be a portable computing device which is configured with flash memory to provide non-volatile memory for storing operating system files and/or user-generated data, for example. Essentially, the data processing device shown in FIG. 2 may be any known or later developed data processing device without architectural limitation.

The illustrative embodiments provide a system and method for capacity upgrade on-demand for input/output (I/O) adapters. With the mechanisms of the illustrative embodiments, a user may order a server computing device, such as that shown in FIG. 2, for example, with additional I/O adapters 284-286 in excess of the current I/O resource needs of the user. The number of additional I/O adapters 284-286 may be dependent upon a number of different factors including the user's expected future needs for I/O resources, the expected lifetime of the server computing device, cost-benefit analysis, or any of a number of other factors that may typically go into a business decision as to what type of computing system to purchase for a user's needs.

When the server computing device is deployed at the user's site, an initial boot of the server computing device is performed using boot code, which may be provided in firmware for example, to bring the server computing device on-line. This boot code may perform a scan of the hardware of the server computing device, initialize the hardware devices and reserve resources for those hardware devices, and load a system image into memory. As part of this initial boot operation, in order to ensure that there will be enough memory reserved for translation control entry (TCE) tables if the additional inactive I/O adapters 284-286 are activated, i.e. brought on-line, the boot code for the server computing device reserves the necessary memory for all inactive I/O adapters 284-286 in addition to the activated I/O adapters 280-282.

While the boot code reserves memory resources for the inactive I/O adapters 284-286, the boot code does not initialize the inactive I/O adapters 284-286. Rather, they remain inactive, i.e. dormant, until activated at a later time by the execution of a small portion of boot code, i.e. miniboot code, in firmware for powering-up, configuring, and initializing the inactive I/O adapters 284-286. The miniboot code may scan the I/O devices coupled to the previously inactive I/O adapters 284-286 and may initialize them in a manner similar to the initial boot operation.

The reservation of memory resources is done during initial boot of the server computing device in order to ensure that these memory resources will be available for storing the TCE tables necessary for on-demand activation of the inactive I/O adapters 284-286. As is generally known in the art, TCE tables are table data structures used by I/O bridges to translate addresses generated by I/O devices into physical memory addresses for purposes of direct memory access (DMA) operations to move data directly between I/O adapters and system memory. The TCE tables are managed by a trusted firmware component of the server computing device referred to as a hypervisor (not shown) which is responsible for virtualizing system memory and managing resources for such virtualization and access of system memory through such virtualization. The TCE tables are stored in system memory and thus, the portion of system memory needed for these tables needs to be reserved. More information regarding TCE tables and their use in DMA operations may be found in the article "Logical Partition Security in the IBM eserver pSeries 690," available at www-03.ibm.com/servers/eserver/pseries/hardware/whitepapers/1par_security.html, which is hereby incorporated by reference. Additional information regarding TCE tables may be found in "Advanced POWER Virtualization on IBM eserver p5 Servers: Architecture and Performance Considerations," November 2005, page 80, available at www.redbooks.ibm.com/redbooks/pdfs/sg245768.pdf, which is hereby incorporated by reference.

The server computing device is provided with a hardware management console, either running on the server computing device, or coupled to the server computing device and running on a separate computing device. The hardware management console (HMC) is responsible for configuring and managing the hardware of the server computing device as well as low-level software functions. The HMC provides for logical partitioning control, creation of partition and system profiles, boot, start, and stop actions for the server computing device or individual partitions, displaying server computing device and partition status, creating and storing configuration backup information, etc. For more information regarding one type of HMC, reference is made to the IBM eserver p5-590 and 595 System Handbook, March 2005, available from International Business Machines, Inc. of Armonk, N.Y. and at www.redbooks.ibm.com/redbooks/pdfs/sg249119.pdf.

With specific importance to the present invention, the HMC is provided with the functionality to provide capacity upgrade on-demand of I/O adapters. The HMC may respond to user inputs via user interfaces provided by the HMC or command line commands, to perform on-demand activation of inactive I/O adapters 284-286. In response to the selection of an on-demand capacity upgrade operation via the user interfaces, for example, an interface for inputting an appropriate activation code may be provided. An activation code entered via the interface may then be validated by the HMC.

Based on a valid activation code, the HMC may perform the necessary operations for bringing on-line one or more of the additional inactive I/O adapters 284-286 provided in the server computing device. For example, the HMC may initiate the execution of a small portion of boot code, i.e. the miniboot code, that boots the I/O adapter 284-286 and causes the hypervisor to configure the I/O adapter's TCE tables for use in performing DMA address translations. Since the memory for such TCE tables has already been reserved by the server computing device during initial boot of the server computing device, the miniboot code may be executed without having to interrupt the normal operation of the server computing device. That is, the server computing device may continue to service user requests while activating the additional I/O adapter 284-286 by executing the miniboot code.

The activate code for activating the inactive I/O adapter 284-286 provided in the server computing device may be obtained in any suitable way. For example, the user may call the provider of the server computing device and purchase an additional license for the additional I/O adapter 284-286. In response, the provider of the server computing device may provide the user with an activation code for activating the I/O adapter 284-286 corresponding to the purchased additional license. As a further example, a user may, via the HMC, send a request for the activation code to a separate server computing system corresponding to the provider of the user's server computing device. The request may be authenticated and a response may be provided with the requested activation code, after the additional license has been purchased. Other mechanisms for obtaining the activation code may be used with the illustrative embodiments, without departing from the spirit and scope of the present invention.

Activation codes may be provided on an individual I/O adapter basis or a single activation code may be used to activate more than one I/O adapter. Thus, for example, the above outlined activation operation may be repeated for each additional inactive I/O adapter that is to be activated. Alternatively, if a bulk activation code is provided, a single entry of an activation code may be used to repeatedly execute the miniboot code to activate a plurality of I/O adapters. In this way, I/O resources and thus, I/O capacity, of the server computing device may be upgraded on-demand by the user without requiring the ordering and shipping of additional hardware devices or the installation of such additional hardware devices by a customer engineer.

Figure 3:
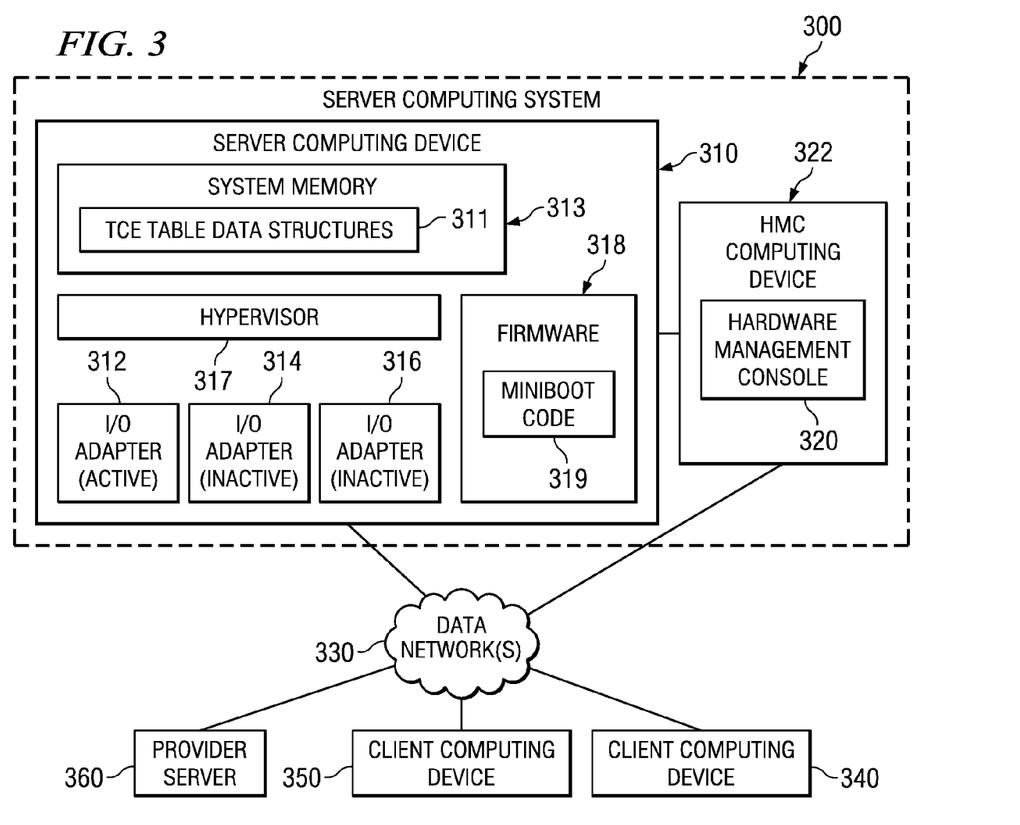
FIG. 3 is an exemplary diagram illustrating an operation of one illustrative embodiment for performing capacity upgrades on-demand by an equipment owner.

FIG. 3 is an exemplary diagram illustrating an operation of one illustrative embodiment for performing capacity upgrades on-demand by an equipment owner. As shown in FIG. 3, an owner of a server computing system 300 wishes to upgrade the I/O capacity of the server computing device 310 which includes active I/O adapter 312 and inactive I/O adapters 314-316. The server computing system 300 further includes a hardware management console (HMC) 320 running on a separate HMC computing device 322. The HMC computing device 322 may be provided in a desktop form, rack mounted form, or the like.

The server computing system 300 is coupled to one or more data networks 330 through which the server computing system 300 may communicate with other computing devices, such as client computing devices 340-350, and provider server 360. Moreover, an owner of the server computing system 300 may communicate with the provider of the server computing device 310 via other means, including voice communication by telephone or the like.

While the client computing devices 340-350 are communicating with the server computing system 300, an owner of the server computing system 300 may request an on-demand I/O capacity upgrade from the provider of the server computing device 310. Such a request may be made by way of a user interface via the HMC 320 of the HMC computing device 322, by placing a telephone call to a call center associated with the provider, or the like. In a preferred embodiment, the user may enter a request for a capacity on-demand upgrade via the HMC 320 by selecting an option in a user interface of the HMC 320 and specifying a number of I/O resources to be added to the server computing device 310.

The entry of the request via the HMC 320 causes the HMC 320 to send a request to the provider server 360 for an activation code to activate one or more of the inactive I/O adapters 314-316. The provider server 360 may authenticate the request and, if authenticated, provide the requested activation code in a response to the request. Of course, a license purchasing negotiation may be performed prior to providing the activation code in a response to the request, if necessary. Such a negotiation may entail specifying terms of the license, obtaining agreement by the owner of the server computing device 310 to the terms of the license, obtaining payment information, authenticating the payment information, and the like. These actions may be performed manually via a voice communication with the owner via a telephone system in an alternative implementation.

If obtained in a response message back from the provider server 360, the activation code may be automatically entered into the HMC 320 for activation of a previously inactive I/O adapter 314-316 in the server computing device 310. Alternatively, if provided to the owner of the server computing device 310, an interface may be provided by the HMC 320 for entry of the activation code. The activation code may be verified by the HMC 320 as a valid activation code, such as through a decryption and authentication process, for example, before performing operations to activate an inactive I/O adapter 314-316. If the activation code is valid, then the HMC 320 may initiate the miniboot code 319 in the firmware 318 of the server computing device 310 to power-up and configure the previously inactive I/O adapter 314-316. The miniboot code 319 may further communicate with the hypervisor 317 of the server computing device 310 to cause the hypervisor 317 to initialize the TCE tables 311 in system memory 313 for the now activated I/O adapter 314-316. The memory space for the TCE tables 311 has been previously reserved in the system memory 313 during initial boot of the server computing device 310, even though the I/O adapters 314-316 were not active at the time of the initial boot.

Once the above process is complete, the previously inactive I/O adapter 314-316 is now activated and usable by the owner of the server computing device 310 and client computing devices 340-350. Thus, the I/O capacity of the server computing device 310 is upgraded on-demand without interrupting the operation of the server computing device 310 with regard to handling client computing device requests.

Figure 4A:
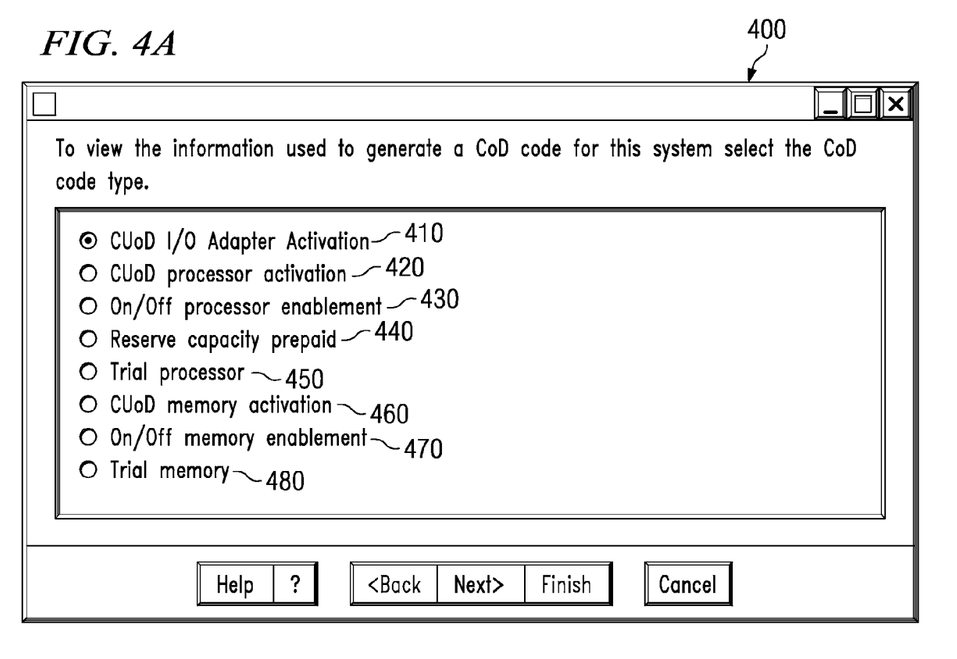
FIG. 4A illustrates a first user interface that may be provided by a Hardware Management Console (HMC) for initiating a capacity upgrade on-demand operation in accordance with one illustrative embodiment.

As mentioned above, the HMC 320 may provide a number of user interfaces through which a user may initiate a capacity upgrade on-demand operation in accordance with the illustrative embodiments. FIG. 4A illustrates a first user interface that may be provided by the HMC 320 for initiating the capacity upgrade on-demand operation. As shown in FIG. 4A, the user interface 400 includes a plurality of user selectable options 410-480 for specifying the operation that the user wishes to perform. With particular importance to the illustrative embodiments herein, one of these user selectable options includes an option 410 for performing a Capacity Upgrade on-Demand (CUOD) of the I/O adapters. The other options depicted in FIG. 4A are described in chapter 4 of the IBM eserver p5-590 and 595 System Handbook previously referenced above. By selecting option 410, a user may initiate a request to a provider server for an activation code, and possibly a license negotiation, the result of which should be an activation code being provided to the user or automatically input to the HMC 320 for use in activating a currently inactive I/O adapter of the server computing device.

Figure 4B:
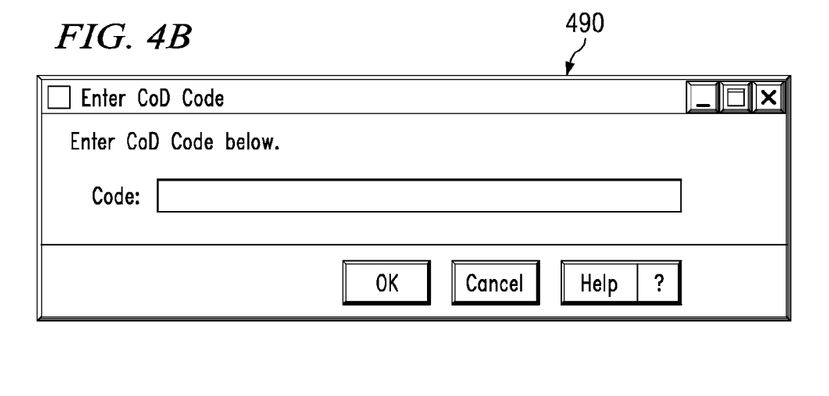
FIG. 4B illustrates a second user interface for entry of an activation code in accordance with one illustrative embodiment.

As mentioned above, depending upon the particular implementation chosen, the activation code may be automatically input to the HMC 320 or may be manually input to the HMC 320. In the case of a manual input of the activation code, in response to the selection of the option 410 in FIG. 4A, a second user interface 490 shown in FIG. 4B may be provided for entry of the activation code. Upon entry of the activation code, either manually or automatically, the HMC 320 may verify the activation code and perform the necessary operations to power-up and initiate the inactive I/O adapter, as previously described.

Figure 5:
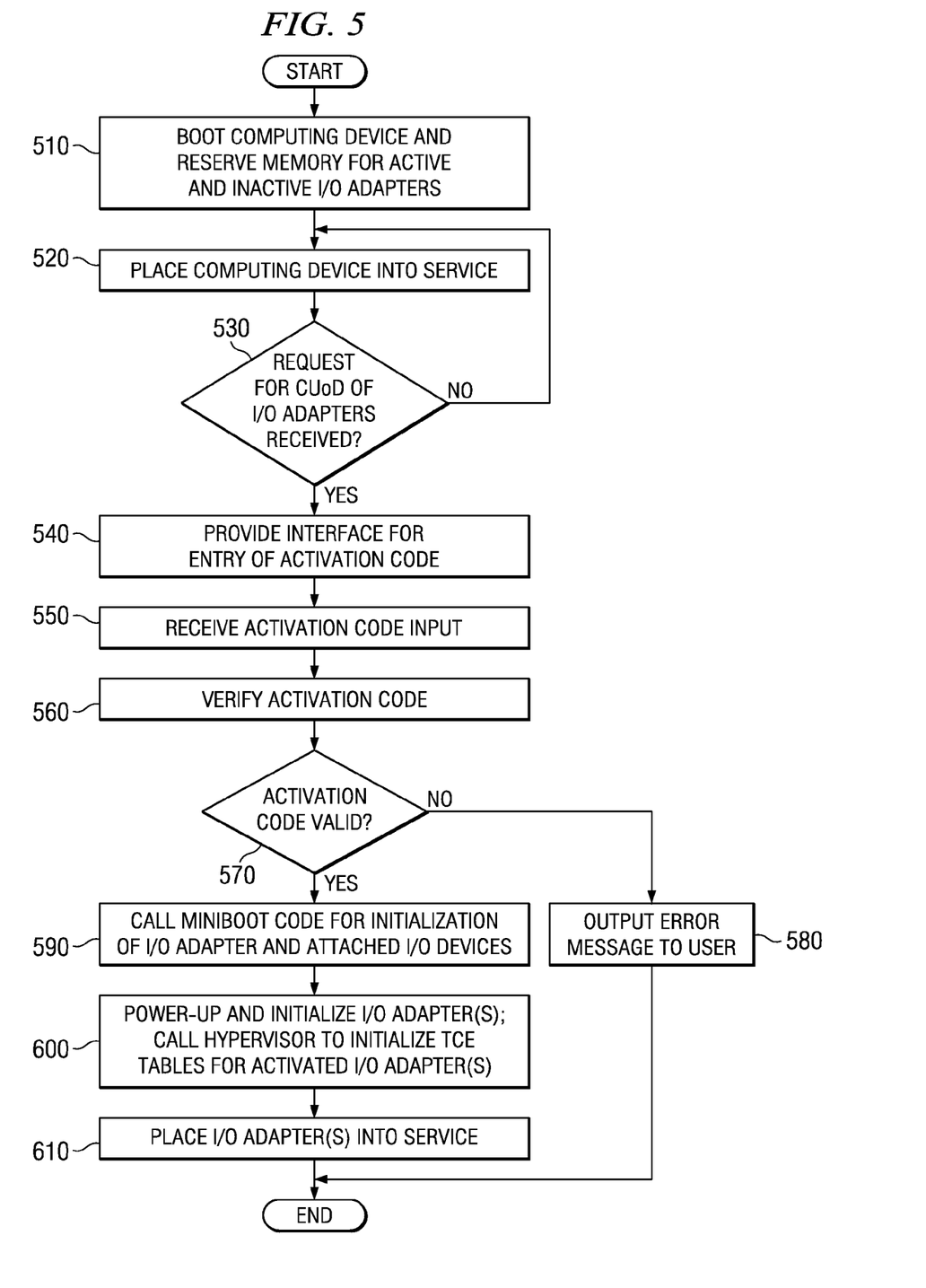
FIG. 5 is a flowchart outlining an exemplary operation for performing a capacity upgrade on-demand operation in accordance with one illustrative embodiment.

FIG. 5 is a flowchart outlining an exemplary operation for performing a capacity upgrade on-demand operation in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

It should be appreciated that the operation outlined in FIG. 5 assumes that a user orders a computing device from a provider, the computing device including additional I/O adapters that are not initially licensed by the user. Thus, the user must predict their expected need for additional I/O adapters in the future and order a computing device with excess I/O adapters to facilitate such future I/O capacity even though these excess I/O adapters are not initially licensed for use by the user. The ordered computing device is installed into the computing system and coupled to an HMC.

With the computing device coupled to the HMC, the HMC then boots the computing device and reserves memory resources for the unlicensed, i.e. inactive, I/O adapters (step 510). The computing device is then made available for use (step 520). The HMC determines whether a request for an on-demand capacity upgrade of the I/O adapters is received from a user (step 530). If not, the operation returns to step 520 where the computing device remains available for use.

If a capacity upgrade on-demand (CUOD) request is received from a user, an interface is provided for entry of an activation code (step 540). This embodiment assumes that the activation code is manually input by the user. However, as mentioned previously above, the CUOD request may result in an activation code request being sent from the HMC to a provider computing system and the activation code being returned in response.

Whether or not the activation code is entered manually or received automatically in response to an activation code request being sent to a provider computing system, the activation code is received (step 550). The input activation code is then verified by the HMC (step 560) and a determination is made as to whether the activation code is valid (step 570). If the activation code is not valid, an error message may be output to the user (step 580).

If the activation code is valid, then the HMC calls the miniboot code for initializing the I/O adapter and any attached I/O devices on the I/O adapter (step 590). This miniboot code may then power-up and initialize the I/O adapter as well as call the hypervisor to initialize the TCE tables for the I/O adapter using the previously reserved memory for the I/O adapter (step 600). The user, and any clients, may then use the newly activated I/O adapter and I/O devices (step 610). The operation then terminates.

Thus, the illustrative embodiments provide a mechanism by which capacity upgrade on-demand operations may be performed with regard to a computing system that has excess inactive resources, e.g., I/O adapters. Because the mechanisms of the illustrative embodiments reserve memory resources for address translation data structures for the inactive I/O adapters prior to the activation of these I/O adapters, and the computing system is provided with miniboot code for powering-up and initializing the inactive I/O adapters, the on-demand upgrade may be performed without interruption of the operation of the computing device. Thus, the upgrade may be performed without having to place the computing device in a downed state. Furthermore, the upgrade may be performed without having to wait for receipt of an additional hardware device and installation of the hardware device by a customer engineer since the hardware is already present in the computing system but is kept in an inactive state until the user's capacity requirements increase.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for enabling an inactive input/output (I/O) adapter of the data processing system, comprising:
    booting the data processing system to an operational state, wherein the inactive I/O adapter is inactive and not initialized after the data processing system is booted;
    reserving memory resources for the inactive I/O adapter of the data processing system while the inactive I/O adapter is inactive, wherein the memory resources are reserved to store an address translation data structure for the inactive I/O adapter in the event that the inactive I/O adapter is activated;
    receiving a request to activate the inactive I/O adapter; and
    executing a miniboot code sequence for initializing the inactive I/O adapter using the reserved memory resources in response to receiving the request to activate the inactive I/O adapter.

2. The method of claim 1, wherein the data processing system comprises a plurality of I/O adapters, and wherein a first set of I/O adapters in the plurality of I/O adapters are activated by the booting of the data processing system and a second set of I/O adapters remain inactive after booting of the data processing system.

3. The method of claim 1, wherein receiving a request to activate the inactive I/O adapter comprises receiving an activation code for activating the inactive I/O adapter.

4. The method of claim 3, wherein the activation code is valid for activating a plurality of inactive I/O adapters in the data processing system.

5. The method of claim 3, wherein receiving the activation code comprises receiving a user input specifying the activation code via a user interface.

6. The method of claim 3, further comprising:
    verifying the activation code; and
    outputting an error message if the activation code is not determined to be valid as a result of the verification of the activation code.

7. The method of claim 6, wherein the execution of the miniboot code is performed in response to the activation code being determined to be valid as a result of the verification of the activation code.

8. The method of claim 1, further comprising:
    sending a request for an activation code, for activating the inactive I/O adapter, to a remote server in response to receiving the request to activate the inactive I/O adapter; and
    receiving the activation code from the remote server.

9. The method of claim 8, wherein the activation code is valid for activating a plurality of inactive I/O adapters in the data processing system.

10. The method of claim 1, wherein the request to activate the inactive I/O adapter is received from a hardware management console computing device coupled to the data processing system.

11. A computer program product comprising computer usable storage medium having a computer readable program encoded thereon, wherein the computer readable program, when executed on a computing device, causes the computing device to:
    boot the computing device to an operational state, wherein an inactive I/O adapter is inactive and not initialized after the computing device is booted;
    reserve memory resources for the inactive I/O adapter of the computing device while the inactive I/O adapter is inactive, wherein the memory resources are reserved to store an address translation data structure for the inactive I/O adapter in the event that the inactive I/O adapter is activated;
    receive a request to activate the inactive I/O adapter; and
    execute a miniboot code sequence for initializing the inactive I/O adapter using the reserved memory resources in response to receiving the request to activate the inactive I/O adapter.

12. The computer program product of claim 11, wherein the computing device comprises a plurality of I/O adapters, and wherein a first set of I/O adapters in the plurality of I/O adapters are activated by the booting of the computing device and a second set of I/O adapters remain inactive after booting of the computing device.

13. The computer program product of claim 11, wherein the computer readable program causes the computing device to receive a request to activate the inactive I/O adapter by receiving an activation code for activating the inactive I/O adapter.

14. The computer program product of claim 13, wherein the activation code is valid for activating a plurality of inactive I/O adapters in the computing device.

15. The computer program product of claim 13, wherein the computer readable program causes the computing device to receive the activation code by receiving a user input specifying the activation code via a user interface.

16. The computer program product of claim 13, wherein the computer readable program further causes the computing device to:
    verify the activation code; and
    output an error message if the activation code is not determined to be valid as a result of the verification of the activation code.

17. The computer program product of claim 16, wherein the execution of the miniboot code is performed in response to the activation code being determined to be valid as a result of the verification of the activation code.

18. The computer program product of claim 11, wherein the computer readable program further causes the computing device to:
    send a request for an activation code, for activating the inactive I/O adapter, to a remote server in response to receiving the request to activate the inactive I/O adapter; and
    receive the activation code from the remote server.

19. The computer program product of claim 11, wherein the request to activate the inactive I/O adapter is received from a hardware management console computing device coupled to the data processing system.

20. An apparatus, comprising:

a processor; and a memory coupled to the processor, wherein the memory contains instructions which, when executed by the processor, cause the processor to:

boot the apparatus to an operational state, wherein an inactive I/O adapter is inactive and not initialized after the apparatus is booted;

reserve memory resources for the inactive I/O adapter of the apparatus while the inactive I/O adapter is inactive, wherein the memory resources are reserved to store an address translation data structure for the inactive I/O adapter in the event that the inactive I/O adapter is activated;

receive a request to activate the inactive I/O adapter; and execute a miniboot code sequence for initializing the inactive I/O adapter using the reserved memory resources in response to receiving the request to activate the inactive I/O adapter.

* * * * *